(12) United States Patent
Glik et al.

(10) Patent No.: US 9,736,250 B2
(45) Date of Patent: Aug. 15, 2017

(54) NON-NETWORK CONTROLLER COMMUNICATION

(71) Applicant: Intel IP Corporation, Santa Clara, CA (US)

(72) Inventors: Michael Glik, Kfar Saba (IL); Daniel Cohn, Raanana (IL); Solomon Trainin, Haifa (IL); Eran Sudak, Herzliya (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/751,212

(22) Filed: Jun. 26, 2015

(65) Prior Publication Data

US 2016/0381148 A1 Dec. 29, 2016

(51) Int. Cl.
| | |
|---|---|
| *H04L 29/08* | (2006.01) |
| *H04W 4/08* | (2009.01) |
| *H04W 8/00* | (2009.01) |
| *H04W 76/02* | (2009.01) |

(52) U.S. Cl.
CPC .............. *H04L 67/16* (2013.01); *H04W 4/08* (2013.01); *H04W 8/005* (2013.01); *H04W 76/022* (2013.01)

(58) Field of Classification Search
CPC ....................................................... H04L 67/16
See application file for complete search history.

(56) References Cited

U.S. PATENT DOCUMENTS

| | | | | |
|---|---|---|---|---|
| 6,842,460 | B1 * | 1/2005 | Olkkonen | H04W 48/16 370/328 |
| 2002/0143944 | A1 * | 10/2002 | Traversat | G06F 9/4416 709/225 |
| 2005/0193106 | A1 * | 9/2005 | Desai | H04L 69/329 709/223 |
| 2005/0254472 | A1 * | 11/2005 | Roh | H04L 45/00 370/338 |
| 2007/0274233 | A1 * | 11/2007 | Ptashek | H04L 67/16 370/254 |
| 2008/0031210 | A1 * | 2/2008 | Abhishek | H04W 8/005 370/338 |
| 2013/0170482 | A1 * | 7/2013 | Jung | H04W 8/005 370/338 |

OTHER PUBLICATIONS

Discover Wi-Fi, Wi-Fi Direct, Wi-Fi Alliance, http://www.wi-fi.org/discover-wi-fi/wi-fi-direct, 4 pages.

* cited by examiner

*Primary Examiner* — Mazda Sabouri
(74) *Attorney, Agent, or Firm* — Grossman, Tucker, Perreault & Pfleger, PLLC

(57) ABSTRACT

The present disclosure is directed to a system for non-network controller communication. In general, an example wireless network may comprise a network controller (NC) device and at least one network member (NM) device. The at least one NM device may respond to inquiries received from outside-of-network (OoN) devices by providing at least an NC device name in a user-friendly form. This information may be provided via a new information element (IE). Should the at least one NC device later receive a service discovery request (e.g., from the OoN device), the at least one NC device may determine whether services it may provide are currently unavailable, and may then transmit a service discovery response including at least unavailable service information. In at least one embodiment, service discovery responses may also include information about current consumers of the unavailable services.

17 Claims, 4 Drawing Sheets

NON-NETWORK CONTROLLER COMMUNICATION

TECHNICAL FIELD

The present disclosure relates to electronic communication, and more particularly, to a system to allow a non-network controller device to respond to out-of-network communications.

BACKGROUND

Wireless communication has moved beyond simple cellular-based voice communication and is now being used for a variety of data-related tasks. For example, devices may utilize long-range wireless mediums such as cellular communications for various applications. However, in some instances wireless interaction may occur via a short-range wireless medium (e.g., within a range of about 65 feet) or a close-proximity wireless medium (e.g., within inches). Short-range and close-proximity wireless mediums such as, for example, Wireless Local Area Networking (WLAN), Bluetooth, radio frequency (RF) such as based on RF Identification (RFID) or Near Field Communication (NFC) standards, infrared (IR), etc. have advantages over long-range wireless communication in that they facilitate wireless interaction in "unregulated" frequency spectrum, and thus are free to operate without having to license the spectrum. As a result, the utilization of short-range and close-proximity wireless communication is continuing to expand.

At least one issue with the use of some short-range wireless communication mediums is the need for a wireless network control entity. For example, WLAN or "Wi-Fi" operating in accordance with the IEEE 802.11 wireless standard is designed to employ an access point (AP) to manage wireless traffic in the network. An AP is not required in Bluetooth networks, which was initially designed as a wireless replacement for wired peripheral connections. The desire for device-to-device (D2D) wireless connectivity, such as provided by Bluetooth, with the stability, throughput, security, equipment availability, etc. of Wi-Fi has yielded "Wi-Fi Direct" or "Wi-Fi Peer-to-Peer (P2P)." Wi-Fi Direct allows Wi-Fi-enabled devices to interact directly without the need for specialized equipment such as a Bluetooth transceiver. While the benefits of Wi-Fi Direct may be apparent, at least one drawback of interaction based on the Wi-Fi Direct Technical Specification as defined by the Wi-Fi Alliance (http://www.wi-fi.org/discover-wi-fi/wi-fi-direct) is the requirement for a device in the network to act as a group owner (GO) to manage wireless interaction within the group. As opposed to a dedicated AP, it may be possible for a GO to become "busy" to a degree that it cannot perform network-related activities such as, for example, responding to inquiries from devices outside the network regarding devices within the network.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
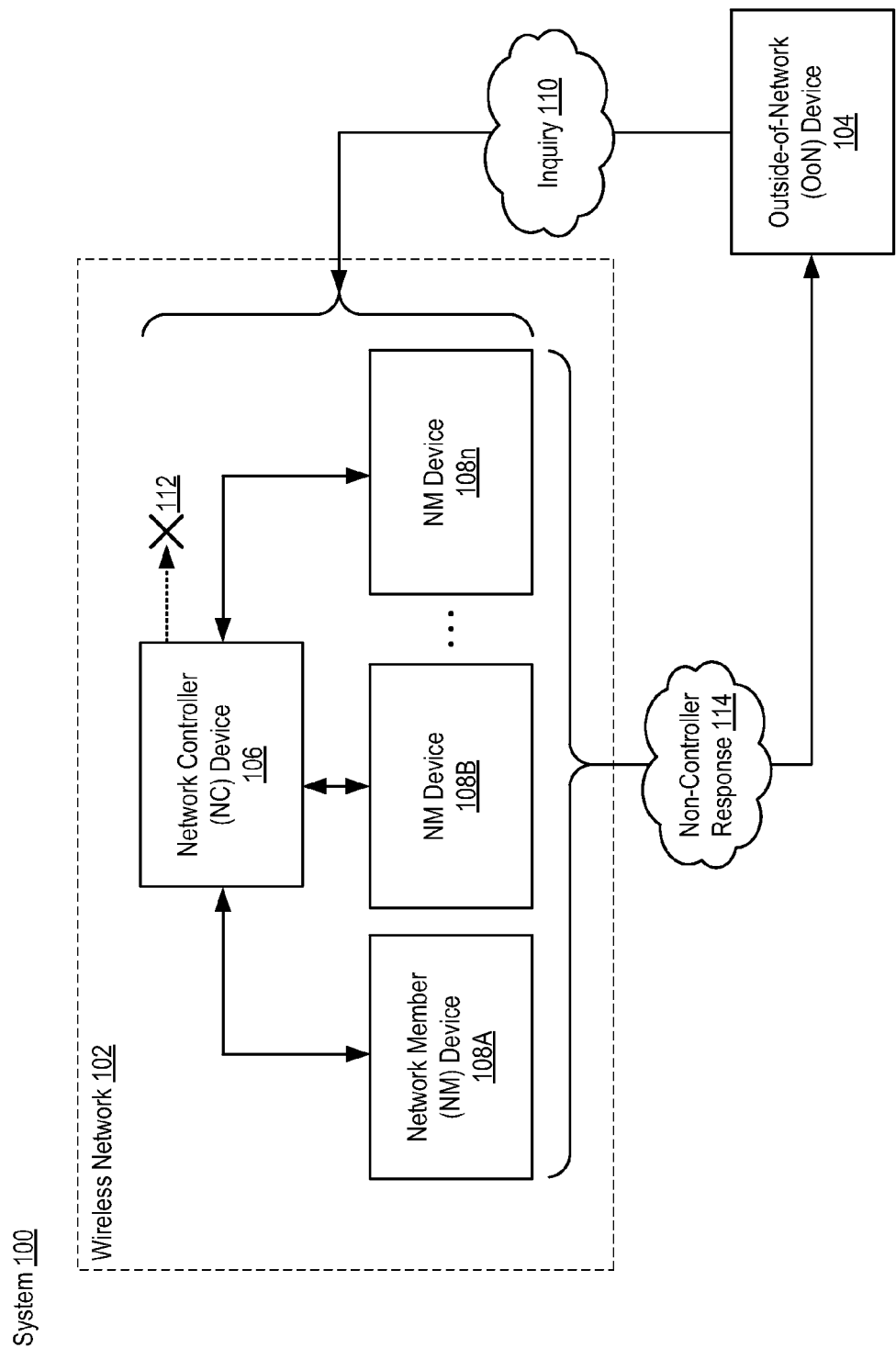
FIG. 1 illustrates an example system for demonstrating non-network controller communication in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to a system for non-network controller communication. In general, an example wireless network may comprise a network controller (NC) device and at least one network member (NM) device. The at least one NM device may respond to inquiries received from outside-of-network (OoN) devices by providing at least an NC device name in a user-friendly form. This information may be provided via a new information element (IE) that is described herein. Should the at least one NC device later receive a service discovery request (e.g., from the OoN device), the at least one NC device may determine whether services it may provide are currently unavailable, and may then transmit a service discovery response including at least unavailable service information. In at least one embodiment, service discovery responses may also include information about current consumers of the unavailable services. The OoN device may then generate a notification to the user based on the unavailable service information.

In at least one embodiment, an example device operable within a wireless network may comprise communication circuitry and service management circuitry. The communication circuitry may be to interact via at least wireless communication. The service management circuitry may be to receive a probe request via the communication circuitry and transmit at least a probe request response via the communication circuitry, the probe request response including at least information identifying a NC device for a wireless network including the device.

In at least one embodiment, the communication circuitry may further be to perform at least one wireless connection establishment operation to connect to at least the NC device in the wireless network. The information identifying the NC device may comprise, for example, at least a user-friendly name for the network controller device. The wireless network may be based on the IEEE 802.11 standard. In this case, the probe request response may comprise at least a service set identifier and a basic service set identifier for the wireless network.

In at least one embodiment, the service management circuitry may also be to receive a service discovery request via the communication circuitry, determine services that are unavailable in the device and transmit a service discovery response via the communication circuitry, the service discovery response including at least information indicating services that are unavailable in the device. The information indicating services that are unavailable in the device may also include data about current consumers of the unavailable services.

Consistent with the present disclosure, a wireless device may comprise, for example, communication circuitry to interact via at least wireless communication and processing circuitry to transmit a probe request via the communication circuitry, receive a probe response request via the communication circuitry, the probe response request identifying a non-network controller device in a wireless network, transmit a service discovery request to at least the non-network controller device via the communication circuitry and receive a service discovery response via the communication circuitry, the service discovery response including at least information indicating services that are unavailable in the non-network controller device. The wireless device may further comprise user interface circuitry to generate at least one notification based on the services that are unavailable in the non-network controller device. The information indicating the services that are unavailable in the device may also include data about current consumers of the unavailable services. The at least one notification may also be based on the current consumers of the unavailable services. Consistent with the present disclosure, an example method for non-network controller communication may comprise receiving a probe request via wireless communication at a device in a wireless network managed by a network controller device and transmitting at least a probe request response including at least information identifying the network controller device for the wireless network.

FIG. 1 illustrates an example system for demonstrating non-network controller communication in accordance with at least one embodiment of the present disclosure. Initially, the following disclosure may make reference to, or may use terminology commonly associated with, certain wireless communication technologies such as Wi-Fi Direct. These references have been utilized herein merely for the sake of explanation, and are not intended to limit the various embodiments consistent with the present disclosure to any particular manner of implementation. While these example technologies provide a basis for understanding the embodiments, actual implementations may employ other similar technologies existing now or developed in the future.

Example system 100 may comprise at least wireless network 102 and at least one OoN device 104. Wireless network 102 may be formed between NC device 106 and at least one NM device 108A, device 108B . . . device 108n (collectively, NM devices 108A . . . n). In general, OoN device 104, NC device 106 and NM devices 108A . . . n may comprise resources configurable to at least process information and interact via wireless communication. Examples of these devices may include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, a server, a group of computing devices organized in a high performance computing (HPC) architecture, a smart television or other type of "smart" device, small form factor computing solutions (e.g., for space-limited applications, TV set-top boxes, etc.) like the Next Unit of Computing (NUC) platform from the Intel Corporation, etc.

Consistent with the present disclosure, wireless network 102 may be formed utilizing Wi-Fi direct or another similar short-range wireless networking technology. Using Wi-Fi direct as an example, connection establishment operations may occur between devices that form wireless network 102. During connection establishment, NC device 106 may be configured to manage the operation of wireless network 102 in a role similar to that of an AP operating in a standard IEEE 802.11 (WLAN) network. At least one other NM device 108A . . . n may form the network with NC device 106 and remain linked to NC device 106 (e.g., via a lower power mode) to, for example, keep timing with wireless network 102, receive commands from NC device 106, etc.

In typical operation, devices may join wireless network 102 to access resources residing in another networked device. For example, NC device 106 may be a smart phone comprising at least multimedia data, and NM device 108A may be capable of presenting multimedia data (e.g., generating sound based on audio content, displaying images/video based on visual content, etc.). NC device 106 may access presentation resources on NM device 108A to present the multimedia content. During this interaction, other NM devices 108B . . . n may be unable to access at least the multimedia playback resources of NM device 108A. For example, given that NM device 108A is a television, monitor, projector, etc. to which NC device 106 is sending video for presentation, NM device 108A would not be able to present other multimedia data while playing the video. The above scenario is merely an example of a single-user service that may be available within network 102. Other scenarios may exist where resources in a device, or the device itself, may only be accessible to other devices one-at-a-time due to the nature of the services they provide (e.g., mobile device docking station, remote control functionality, certain types of printers, etc.).

OoN device 104 may seek to access resources within network 120. In typical operation, OoN device 104 may interact with NC device 106 to join the network, learn what functionality is available from NM devices 108A . . . n, etc. However, NC device 106 is not a dedicated AP, and may at times be unable to respond to OoN device 104. For example, NC device 106 may access a resource in NM device 108A and during the access may be unable to respond to other devices. Consistent with the present disclosure, NM devices 108A . . . n may be able to respond directly to an inquiry from OoN device 104, and in this response may inform OoN device 104 of at least services that are currently unavailable due to, for example, the services already being accessed by other devices in wireless network 102. In an example of operation, OoN device 104 may initially transmit an inquiry to all devices in wireless network 102 as shown at 110. NC device 106 and NM devices 108A . . . n may receive the inquiry. NC device 106 would normally respond to inquiry 110, however, as shown at 112 in this example NC device 106 is not able to respond. The inability of NC device 106 to respond is alleviated by NM devices 108A . . . n responding to inquiry 110 directly as shown at 114. In this manner, OoN device 104 may still learn the status of services in NM devices 108A . . . n without having to wait for NC device 106 to respond.

In at least one embodiment, non-controller response 114 may include at least two phases. Initially, non-controller response 114 may provide to OoN device 104 a user-friendly name of NC device 106 (e.g., "My device," "Jim's phone", "ABC Company Device #3," etc.) along with information usable to connect to wireless network 102. The receipt of this initial response may, for example, allow OoN device 104 to inform a user that OoN device 104 is receiving a response from an NM device 108A . . . n in wireless network 102, and may further automatically, or upon user action, cause OoN device 104 to send another message inquiring about services available from NM devices 108A . . . n. Each NM device 108A . . . n may respond to the further inquiry by providing at least information about currently unavailable services. OoN device 104 may use at least the received unavailable service information to generate a user notification. An example user notification may include presenting information on a display in OoN device 104 identifying NM devices 108A . . . n from which responses were received. Selecting one of the displayed NM devices 108A . . . n may cause OoN device 104 to present at least the unavailable services for the selected NM device 108A . . . n. When the response from NM devices 108A . . . n comprises "full" service information (e.g., including both available an unavailable services), OoN device 104 may present a list of all services in the particular NM device 108A . . . n along with indicia indicating the particular services that are currently unavailable. In at least one embodiment, the unavailable service information may also identify current consumers of unavailable services. A "consumer" of a service may be a device or user that is currently utilizing the service. Continuing with the explanatory example set forth above, NM device 108A may transmit a response to OoN device 104 indicating that NC device 106 is currently utilizing multimedia playback services on NM device 108A. This information may be presented to the user of OoN device 104. Knowing the consumer of an unavailable service may allow for corrective action. For example, the user of OoN device 104 may manually halt video playback on NM device 108A, may confirm with the user of NC device 106 that is it OK to halt video playback, etc. When the situation is rectified, OoN device 104 may join wireless network 102 and access resources in NM devices 108A . . . n.

Figure 2:
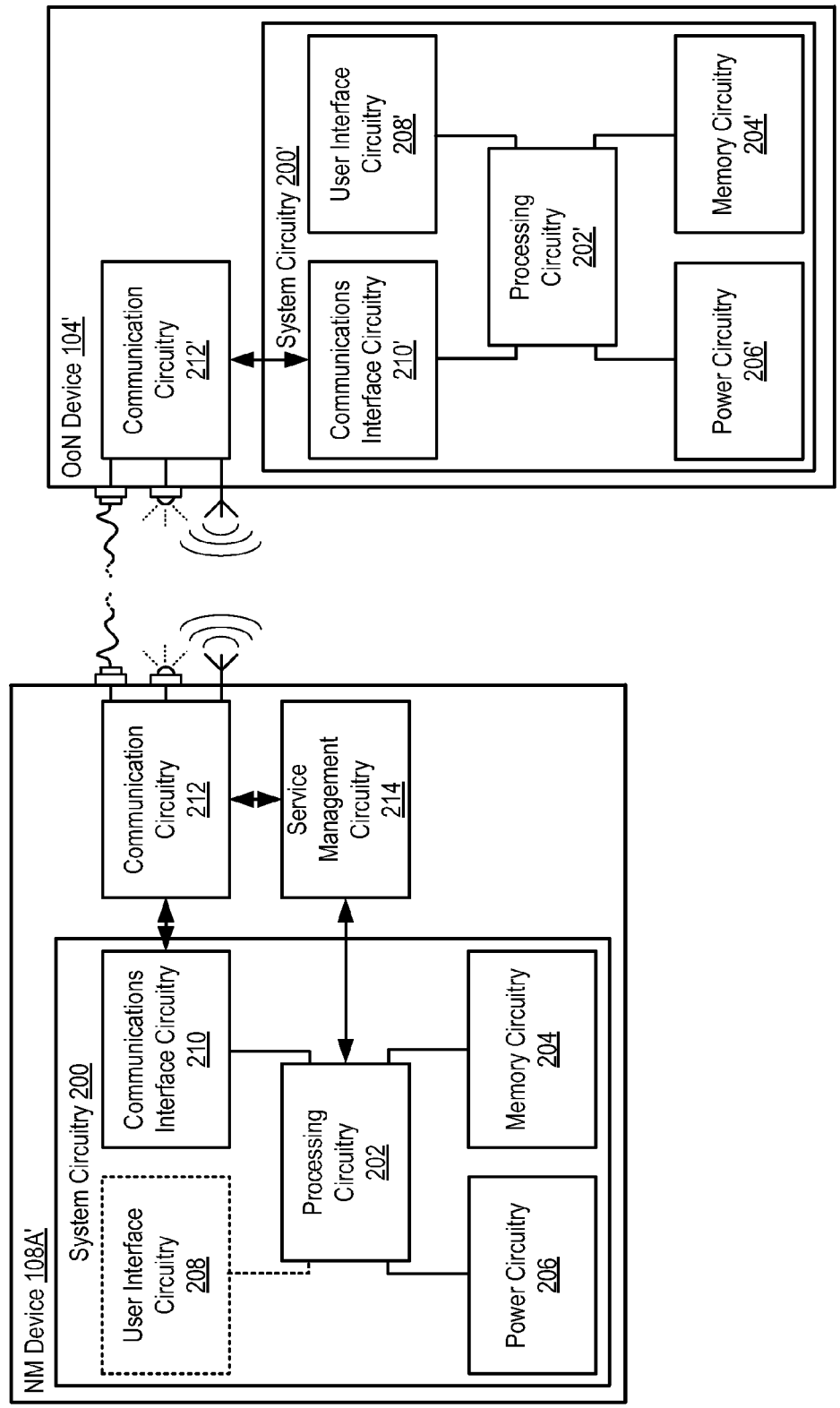
FIG. 2 illustrates example configurations for network and an outside-of network devices usable in accordance with at least one embodiment of the present disclosure.

FIG. 2 illustrates example configurations for network and an outside-of network devices usable in accordance with at least one embodiment of the present disclosure. The inclusion of an apostrophe after an item number (e.g., 100') in the present disclosure indicates that an example embodiment of the corresponding item is being illustrated. For example, NM device 108A' and/or OoN device 104' may be capable of performing any or all of the activities disclosed in FIG. 1. However, NM device 108A' and OoN device 104' are disclosed only as examples of apparatuses usable in embodiments consistent with the present disclosure, and are not intended to limit these embodiments to any particular manner of implementation. Moreover, the example configuration for NM device 108A' illustrated in FIG. 2 may be applicable to any or all of NM devices 108B . . . n.

NM device 108A' may comprise, for example, system circuitry 200 to manage operation of the device. System circuitry 200 may include, for example, processing circuitry 202, memory circuitry 204, power circuitry 206, user interface circuitry 208 and communication interface circuitry 210. NM device 108A' may further include communication circuitry 212 and service management circuitry 214. While communication circuitry 210 and service management circuitry 214 are illustrated as separate from system circuitry 200, the example configuration shown in FIG. 2 has been provided herein merely for the sake of explanation. Some or all of the functionality associated with communication circuitry 208 and/or service management circuitry 214 may also be incorporated into system circuitry 200.

In NM device 108A', processing circuitry 202 may comprise one or more processors situated in separate components, or alternatively one or more processing cores in a single component (e.g., in a system-on-chip (SoC) configuration), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing circuitry 202 may interact with other system components that may be operating at different speeds, on different buses, etc. in NM device 108A'. Moreover, some or all of the functionality commonly associated with the support circuitry may also be included in the same physical package as the processor (e.g., such as in the Sandy Bridge family of processors available from the Intel Corporation).

Processing circuitry 202 may be configured to execute various instructions in NM device 108A'. Instructions may include program code configured to cause processing circuitry 202 to perform activities related to reading data, writing data, processing data, formulating data, converting data, transforming data, etc. Information (e.g., instructions, data, etc.) may be stored in memory circuitry 204. Memory circuitry 204 may comprise random access memory (RAM) and/or read-only memory (ROM) in a fixed or removable format. RAM may include volatile memory configured to hold information during the operation of NM device 108A' such as, for example, static RAM (SRAM) or dynamic RAM (DRAM). ROM may include non-volatile (NV) memory circuitry configured based on BIOS, UEFI, etc. to provide instructions when NM device 108A' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power circuitry 206 may include internal power sources (e.g., a battery, fuel cell, etc.) and/or external power sources (e.g., electromechanical or solar generator, power grid, external fuel cell, etc.), and related circuitry configured to supply NM device 108A' with the power needed to operate. User interface circuitry 208 may include hardware and/or software to allow users to interact with NM device 108A' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 208 may be incorporated within NM device 108A' and/or may be coupled to NM device 108A' via a wired or wireless communication medium. User interface circuitry 208 may be optional in certain circumstances such as, for example, a situation wherein NM device 108A' is a server (e.g., rack server, blade server, etc.) that does not include user interface circuitry 208, and instead relies on another device (e.g., a management terminal) for user interface functionality.

Communication interface circuitry 210 may be configured to manage packet routing and other control functions for communication circuitry 212, which may include resources configured to support wired and/or wireless communications. In some instances, NM device 108A' may comprise more than one set of communication circuitry 212 (e.g., including separate physical interface circuits for wired protocols and/or wireless radios) managed by a centralized communication interface circuitry 210. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, ZigBee, etc.), long range wireless mediums (e.g., cellular wide-area radio communication technology, satellite-based communications, etc.), electronic communications via sound or light waves, etc. In one embodiment, communication interface circuitry 210 may be configured to prevent wireless communications that are active in communication circuitry 212 from interfering with each other. In performing this function, communication interface circuitry 210 may schedule activities for communication circuitry 212 based on, for example, the relative priority of messages awaiting transmission. While the embodiment disclosed in FIG. 2 illustrates communication interface circuitry 210 being separate from communication circuitry 212, it may also be possible for the functionality of communication interface circuitry 210 and communication circuitry 212 to be incorporated into the same circuitry.

Consistent with the present disclosure, service management circuitry 214 may comprise standalone circuitry in NM device 108A' such as, for example, an SoC or other single integrated circuit (IC) solution, a chipset, an arrangement of discrete logical and/or analog circuitry, etc. In another embodiment, at least part of the equipment that may be required to execute functionality commonly associated with service management circuitry 214 may reside in other circuitry within NM device 108A' such as, for example, processing circuitry 202 and/or communication circuitry 212. It may also be possible for at least part of service management circuitry 214 to be encoded in a program that is stored in memory circuitry 206 and executed processing circuitry 202. For example, a programmatic portion of service management circuitry 214 may be based on C (e.g., any of the various versions of C), Go, Python, FORTRAN, Lisp, Visual Basic, iOS, Ruby, Java, AngularJS, Node.js or any other computer programming language existing now or in the future.

Service management circuitry 214 may interact with at least communication circuitry 212 and processing circuitry 202. In an example of operation, service management circuitry 214 may receive inquiries via communication circuitry 212. In an initial phase of non-controller response 114, service management circuitry 214 may at least cause communication circuitry 212 to send a response including at least a user-friendly name for NC device 106 to a probe request (e.g., that was received from OoN device 104'). If a subsequent service discovery request is received in NM device 108' via communication circuitry 212, service management circuitry 214 may then interact with processing circuitry 202 to determine at least services that are unavailable in NM device 108A', and may utilize communication circuitry 212 to send a service discovery response including at least information indicating currently unavailable services in NM device 108A'.

OoN device 104' may comprise, for example, at least processing circuitry 202', memory circuitry 204', power circuitry 206', user interface 208', communications interface circuitry 210' and communication circuitry 212' that may be functionally similar to the corresponding circuitry 200 . . . 212 described above. However, since OoN device 104' and NM device 108A' may be of different types (e.g. OoN device 104' may be a tablet computing device while NM device 108A' may be a multimedia playback device), the actual implementation of circuitry 200' . . . 212' may differ. Circuitry 200' to 212' in OoN device 104' may work alone or together to perform various functions such as, for example, transmitting inquiries to at least NM device 108A', receiving responses from at least NM device 108A', generating notifications, etc. For example, processing circuitry 202' may interact with at least communication circuitry 212' to transmit and receive messages, and may interact with at least user interface circuitry 208' to generate a notification (e.g., to present information to a user about services that are currently unable in device NM 108A', about the consumers of the unavailable services, etc.).

Figure 3:
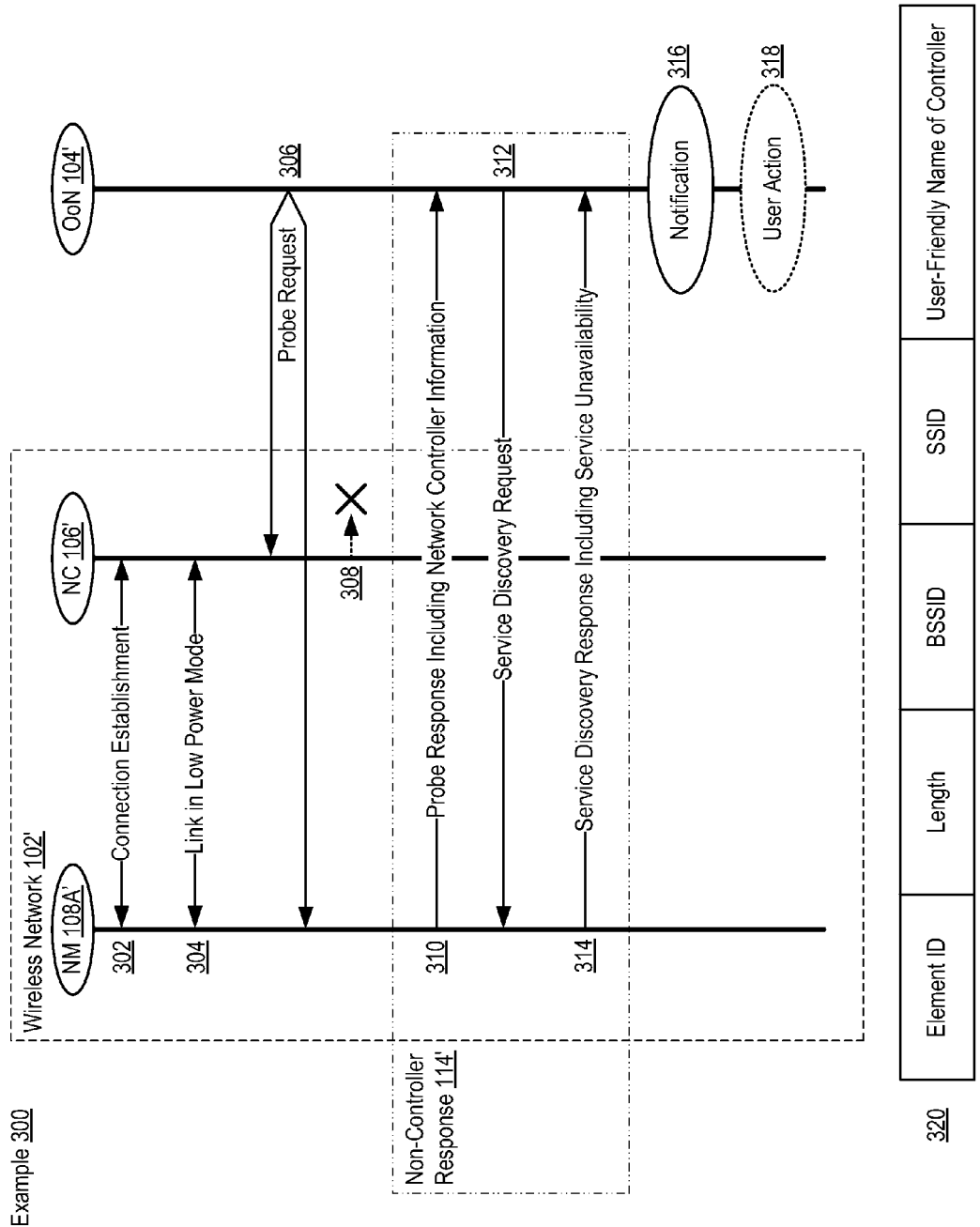
FIG. 3 illustrates example interactions that may occur during non-network controller communication in accordance with at least one embodiment of the present disclosure.

FIG. 3 illustrates example interactions that may occur during non-network controller communication in accordance with at least one embodiment of the present disclosure. Example 300 illustrates interactions that may occur between wireless network 102', which may include at least NM device 108A' and NC device 106', and OoN device 104'. In at least one embodiment, wireless network 102' may be initiated between at least NM device 108A' and NC device 106' via connection establishment 302. During connection establishment 302 device identification (ID) information may be exchanged, a determination may be made as to which device will be the GO for Wi-Fi direct networks (e.g., NC device 106'), network timing and frequency hopping patterns may be established, network security may be configured, etc. NM device 108A' and NC device 106' may then continue to interact via a low power link 304 to, for example, maintain timing synchronization in wireless network 102', exchange data/messages/commands, etc.

Activity occurring on OoN device 104' may then cause the transmission of probe requests 306. For example, an application, utility, service or other program may be activated to cause OoN device 104' to transmit probe requests 306. Normally, NC device 106' may respond to the probe requests, identify itself as the GO of wireless network 102', advertise services that are available in the network, etc. However, as shown at 308 NC device 106' may be unable to respond for various reasons including, for example, device operational conditions (e.g., being in a low power state), environmental conditions (e.g., environmental interference affecting wireless communication), being busy with other activities such as consuming services from NM device 108A', etc. Regardless of ability of NC device 106' to respond, non-controller response 114' may proceed for any or all of NM devices 108A . . . n in wireless network 102'. For example, NM device 108A' may transmit a probe response including network controller information 310. An example information element (IE) is shown at 320 that may be employed in probe response 310. Example IE 320 may comprise at least an element ID and a "user-friendly" name of NC device 106' (e.g., a name of NC device 106' that a user of OoN device 104' may readily associate with NC device 106'). IE 320 may further comprise information that may be needed to join a Wi-Fi direct network such as a basic service set identifier (BSSID) and a service set identifier (SSID).

Following the reception of probe response 310, OoN device 104' may transmit service discovery request 312 to, for example, request information about services that are available in at least NM device 108A'. NM device 108A' may then transmit service discovery response 314 to inform OoN device 104' about at least currently unavailable services in NM device 108A'. In at least one embodiment, service discovery response 314 may also comprise information about the current consumers of the unavailable services. OoN 104' may generate notification 316 to, for example, notify a user of OoN device 104' about currently unavailable services. Notification 316 may optionally be followed by user action 318 wherein the unavailable service/consumer information may be used to free up at least one unavailable service for use by OoN device 104'.

Figure 4:
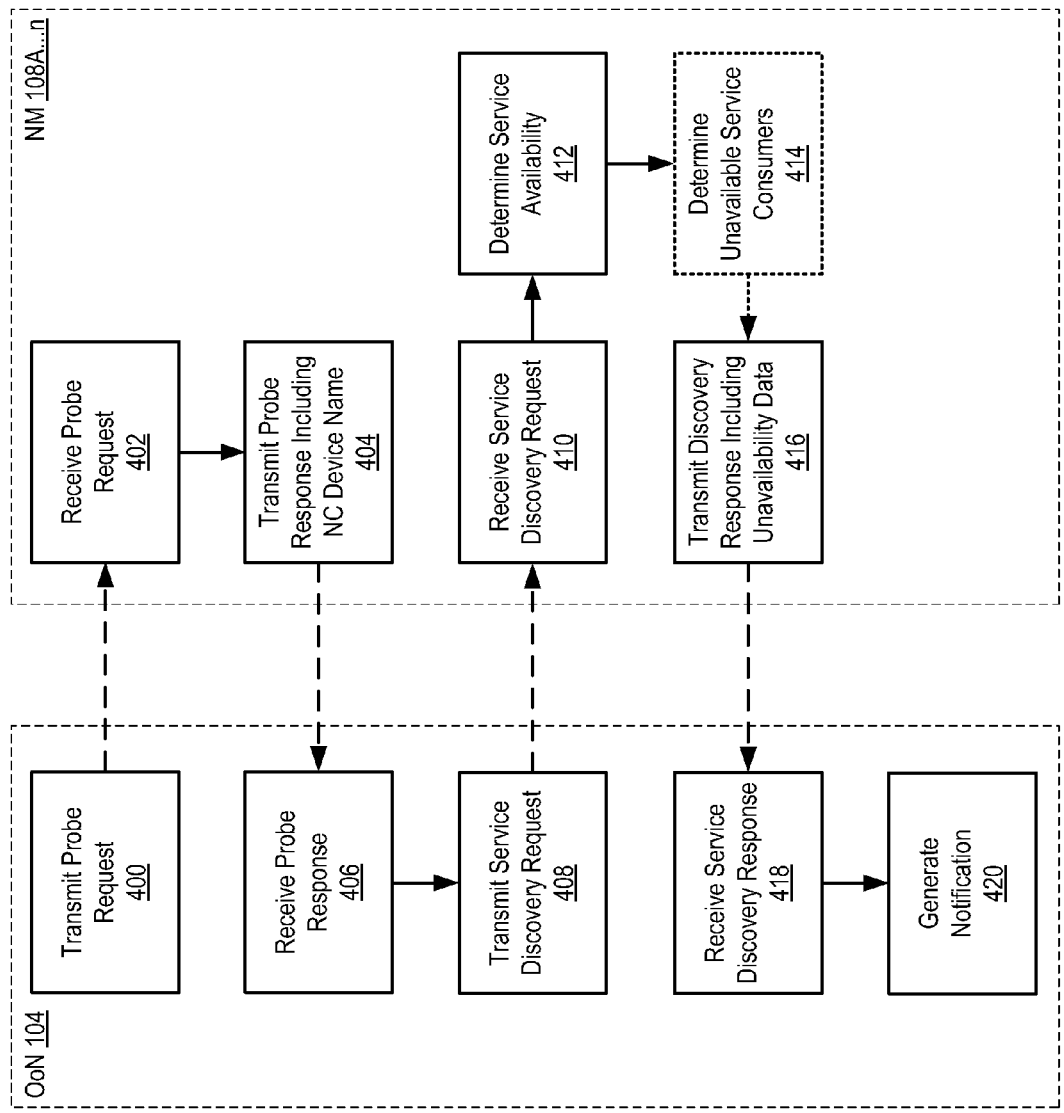
FIG. 4 illustrates example operations for non-network controller communication in accordance with at least one embodiment of the present disclosure.

FIG. 4 illustrates example operations for non-network controller communication in accordance with at least one embodiment of the present disclosure. Consistent with the present disclosure, operations 400, 406, 408, 418 and 420 may be performed by OoN device 104, while operations 402, 404, 410 to 416 may be performed by at least one NM device 108A . . . n. A probe request may be transmitted in operation 400. The probe request transmission may occur due to, for example, manual configuration, the execution of an application, program utility, service, etc. The probe request may be received in operation 402 and a probe response including at least a user-friendly name for NC device 106 (e.g., the GO of wireless network 102 when Wi-Fi direct is employed) may be transmitted in operation 404. The probe response may be received in operation 406, and a service discovery request may be transmitted in operation 408 (e.g., to at least the NM devices 108A . . . n that previously responded to the probe request in operation 404).

Upon receiving the service discovery request in operation 410, service availability may be determined in operation 412. For example, each NM device 108A . . . n may determine which of the services they offer are currently unavailable. Operation 414 may be optional in that it is not required for all embodiments. In operation 414, consumers for unavailable services may be determined. NM devices 108A . . . n that received the service discovery request in operation 410 may then transmit a service discovery response including at least the unavailable data determined in operation 416 (and optionally in operation 414). At least one service discovery response may be received in operation 418 and a notification may be generated in operation 420. For example, OoN device 104 may display information to a user indicating at least the currently unavailable services in NM devices 108A . . . n that responded to the service discovery, possibly along with information about the consumers of the currently unavailable services.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As employed in any embodiment herein, "Circuitry" may comprise, for example, singly or in any combination, hard-wired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Any of the operations described herein may be implemented in one or more storage devices (e.g., non-transitory storage devices) having stored thereon, individually or in combination, instructions that when executed by one or more processors perform one or more operations. Also, it is intended that operations described herein may be distributed across a plurality of physical devices, such as processing structures at more than one different physical location. The storage devices may include any type of tangible device, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions.

Thus, this disclosure is directed to a system for non-network controller communication. In general, an example wireless network may comprise a network controller (NC) device and at least one network member (NM) device. The at least one NM device may respond to inquiries received from outside-of-network (OoN) devices by providing at least an NC device name in a user-friendly form. This information may be provided via a new information element (IE) that is described herein. Should the at least one NC device later receive a service discovery request (e.g., from the OoN device), the at least one NC device may determine whether services it may provide are currently unavailable, and may then transmit a service discovery response including at least unavailable service information. In at least one embodiment, service discovery responses may also include information about current consumers of the unavailable services.

Thus, the present disclosure is directed to a system for non-network controller communication. In general, an example wireless network may comprise a network controller (NC) device and at least one network member (NM) device. The at least one NM device may respond to inquiries received from outside-of-network (OoN) devices by providing at least an NC device name in a user-friendly form. This information may be provided via a new information element (IE). Should the at least one NC device later receive a service discovery request (e.g., from the OoN device), the at least one NC device may determine whether services it may provide are currently unavailable, and may then transmit a service discovery response including at least unavailable service information. In at least one embodiment, service discovery responses may also include information about current consumers of the unavailable services.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for non-network controller communication.

According to example 1 there is provided a device operable within a wireless network. The device may comprise communication circuitry to interact via at least wireless communication and service management circuitry to receive a probe request via the communication circuitry and transmit at least a probe request response via the communication circuitry, the probe request response including at least information identifying a network controller device for a wireless network including the device.

Example 2 may include the elements of example 1, wherein the communication circuitry is to perform at least one wireless connection establishment operation to connect to at least the network controller device in the wireless network.

Example 3 may include the elements of any of examples 1 to 2, wherein the information identifying the network controller device comprises at least a user-friendly name for the network controller device.

Example 4 may include the elements of example 3, wherein the wireless network is based on the IEEE 802.11 standard.

Example 5 may include the elements of example 4, wherein the probe request response comprises at least a service set identifier and a basic service set identifier for the wireless network.

Example 6 may include the elements of any of examples 4 to 5, wherein the information identifying the network controlling device is an information element (IE).

Example 7 may include the elements of any of examples 1 to 6, wherein the service management circuitry is to receive a service discovery request via the communication circuitry, determine services that are unavailable in the device and transmit a service discovery response via the communication circuitry, the service discovery response including at least information indicating services that are unavailable in the device.

Example 8 may include the elements of example 7, wherein the information indicating services that are unavailable in the device includes data about current consumers of the unavailable services.

Example 9 may include the elements of example 8, wherein the data about current consumers includes a name of at least one of a device or a user currently using the unavailable service.

Example 10 may include the elements of any of examples 1 to 9, wherein the wireless network is based on the IEEE 802.11 standard and the probe request response comprises at least a service set identifier and a basic service set identifier for the wireless network.

According to example 11 there is provided a wireless device. The wireless device may comprise communication circuitry to interact via at least wireless communication and processing circuitry to transmit a probe request via the communication circuitry, receive a probe response request via the communication circuitry, the probe request response identifying a non-network controller device in a wireless network, transmit a service discovery request to at least the non-network controller device via the communication circuitry and receive a service discovery response via the communication circuitry, the service discovery response including at least information indicating services that are unavailable in the non-network controller device.

Example 12 may include the elements of example 11, and may further comprise user interface circuitry to generate at least one notification based on the services that are unavailable in the non-network controller device.

Example 13 may include the elements of example 12, wherein the information indicating the services that are unavailable in the device includes data about current consumers of the unavailable services.

Example 14 may include the elements of example 13, wherein the data about current consumers includes a name of at least one of a device or a user currently using the unavailable service.

Example 15 may include the elements of any of examples 13 to 14, wherein the at least one notification is also based on the current consumers of the unavailable services.

According to example 16 there is provided a method for non-network controller communication. The method may comprise receiving a probe request via wireless communication at a device in a wireless network managed by a network controller device and transmitting at least a probe request response including at least information identifying the network controller device for the wireless network.

Example 17 may include the elements of example 16, and may further comprise performing at least one wireless connection establishment operation to connect the device and at least the network controller device in the wireless network.

Example 18 may include the elements of any of examples 16 to 17, wherein the information identifying the network controller device comprises at least a user-friendly name for the network controller device.

Example 19 may include the elements of any of examples 16 to 18, wherein the wireless network is based on the IEEE 802.11 standard.

Example 20 may include the elements of example 19, wherein the probe request response comprises at least a service set identifier and a basic service set identifier for the wireless network.

Example 21 may include the elements of any of examples 19 to 20, wherein the information identifying the network controlling device is an information element (IE).

Example 22 may include the elements of any of examples 16 to 21, and may further comprise receiving a service discovery request at the device, determining services that are unavailable in the device and transmitting a service discovery response including at least information indicating the services that are unavailable in the device.

Example 23 may include the elements of example 22, wherein the data indicating the services that are unavailable in the device includes data about current consumers of the unavailable services.

Example 24 may include the elements of example 23, wherein the data about current consumers includes a name of at least one of a device or a user currently using the unavailable service.

Example 25 may include the elements of any of examples 16 to 24, wherein the wireless network is based on the IEEE 802.11 standard and the probe request response comprises at least a service set identifier and a basic service set identifier for the wireless network.

According to example 26 there is provided a method for interacting with a non-network controller device. The method may comprise transmitting a probe request, receiving a probe response request, the probe response request identifying a non-network controller device in a wireless network, transmitting a service discovery request to at least the non-network controller device and receiving a service discovery response, the service discovery response including at least information indicating services that are unavailable in the non-network controller device.

Example 27 may include the elements of example 26, and may further comprise generating at least one notification based on the services that are unavailable in the non-network controller device.

Example 28 may include the elements of example 27, wherein the information indicating the services that are unavailable in the device includes data about current consumers of the unavailable services.

Example 29 may include the elements of example 28, wherein the data about current consumers includes a name of at least one of a device or a user currently using the unavailable service.

Example 30 may include the elements of any of examples 28 to 29, wherein the at least one notification is also based on the current consumers of the unavailable services.

According to example 31 there is provided a system including at least a device and a network controller device, the system being arranged to perform the method of any of the above examples 16 to 30.

According to example 32 there is provided a chipset arranged to perform the method of any of the above examples 16 to 30.

According to example 33 there is provided at least one machine readable medium comprising a plurality of instructions that, in response to be being executed on a computing device, cause the computing device to carry out the method according to any of the above examples 16 to 30.

According to example 34 there is provided at least one device configured for non-network controller communication, the device being arranged to perform the method of any of the above examples 16 to 30.

According to example 35 there is provided a system for non-network controller communication. The system may comprise means for receiving a probe request via wireless communication at a device in a wireless network managed by a network controller device and means for transmitting at least a probe request response including at least information identifying the network controller device for the wireless network.

Example 36 may include the elements of example 35, and may further comprise means for performing at least one wireless connection establishment operation to connect the device and at least the network controller device in the wireless network.

Example 37 may include the elements of any of examples 35 to 36, wherein the information identifying the network controller device comprises at least a user-friendly name for the network controller device.

Example 38 may include the elements of example 37, wherein the wireless network is based on the IEEE 802.11 standard.

Example 39 may include the elements of example 38, wherein the probe request response comprises at least a service set identifier and a basic service set identifier for the wireless network.

Example 40 may include the elements of any of examples 38 to 39, wherein the information identifying the network controlling device is an information element (IE).

Example 41 may include the elements of any of examples 35 to 40, and may further comprise means for receiving a service discovery request at the device, means for determining services that are unavailable in the device and means for transmitting a service discovery response including at least information indicating the services that are unavailable in the device.

Example 42 may include the elements of example 41, wherein the data indicating the services that are unavailable in the device includes data about current consumers of the unavailable services.

Example 43 may include the elements of example 42, wherein the data about current consumers includes a name of at least one of a device or a user currently using the unavailable service.

According to example 44 there is provided a system for interacting with a non-network controller device. The system may comprise means for transmitting a probe request, means for receiving a probe response request, the probe response request identifying a non-network controller device in a wireless network, means for transmitting a service discovery request to at least the non-network controller device and means for receiving a service discovery response, the service discovery response including at least information indicating services that are unavailable in the non-network controller device.

Example 45 may include the elements of example 44, and may further comprise means for generating at least one notification based on the services that are unavailable in the non-network controller device.

Example 46 may include the elements of example 45, wherein the information indicating the services that are unavailable in the device includes data about current consumers of the unavailable services.

Example 47 may include the elements of example 46, wherein the data about current consumers includes a name of at least one of a device or a user currently using the unavailable service.

Example 48 may include the elements of any of examples 46 to 47, wherein the at least one notification is also based on the current consumers of the unavailable services.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device operable within a wireless network, comprising:
   communication circuitry to interact via at least wireless communication; and
   service management circuitry to:
   receive a probe request via the communication circuitry;
   transmit at least a probe request response via the communication circuitry, the probe request response including at least information identifying a network controller device for a wireless network including the device;
   receive a service discovery request via the communication circuitry;
   determine services that are unavailable in the device; and
   transmit a service discovery response via the communication circuitry, the service discovery response including at least information indicating services that are unavailable in the device;
   wherein the information indicating services that are unavailable in the device includes data about current consumers of the unavailable services.

2. The device of claim 1, wherein the communication circuitry is to perform at least one wireless connection establishment operation to connect to at least the network controller device in the wireless network.

3. The device of claim 1, wherein the information identifying the network controller device comprises at least a user-friendly name for the network controller device.

4. The device of claim 3, wherein the wireless network is based on the IEEE 802.11 standard.

5. The device of claim 4, wherein the probe request response comprises at least a service set identifier and a basic service set identifier for the wireless network.

6. A wireless device, comprising:
   communication circuitry to interact via at least wireless communication; and
   processing circuitry to:
   transmit a probe request via the communication circuitry;
   receive a probe response request via the communication circuitry, the probe response request identifying a non-network controller device in a wireless network;
   transmit a service discovery request to a non-network controller device via the communication circuitry; and
   receive a service discovery response via the communication circuitry, the service discovery response including at least information indicating services that are unavailable in the non-network controller device;
   user interface circuitry configured to generate at least one notification based on the services that are unavailable in the non-network controller device, wherein the notification indicating that the services are unavailable in the non-network controller device includes data about current consumers of the unavailable services.

7. The device of claim 6, wherein the at least one notification is also based on the current consumers of the unavailable services.

8. A method for non-network controller communication, comprising:
   receiving a probe request via wireless communication at a device in a wireless network managed by a network controller device; and
   transmitting at least a probe request response including at least information identifying the network controller device for the wireless network
   receiving a service discovery request at a device;
   determining services that are unavailable in the device; and
   transmitting a service discovery response including at least information indicating the services that are unavailable in the device;
   wherein the information indicating the services that are unavailable in the device includes data about current consumers of the unavailable services.

9. The method of claim 8, further comprising:
   performing at least one wireless connection establishment operation to connect the device and at least the network controller device in the wireless network.

10. The method of claim 8, wherein the information identifying the network controller device comprises at least a user-friendly name for the network controller device.

11. The method of claim 10, wherein the wireless network is based on the IEEE 802.11 standard.

12. The method of claim 11, wherein the probe request response comprises at least a service set identifier and a basic service set identifier for the wireless network.

13. At least one machine-readable storage device having stored thereon, individually or in combination, instructions for non-network controller communication that, when executed by one or more processors, cause the one or more processors to:
    receive a probe request via wireless communication at a device in a wireless network managed by a network controller device;
    transmit at least a probe request response including at least information identifying the network controller device for the wireless network
    receive a service discovery request at a device;
    determine services that are unavailable in the device; and
    transmit a service discovery response including at least information indicating the services that are unavailable in the device;
    wherein the information indicating the services that are unavailable in the device includes data about current consumers of the unavailable services.

14. The storage device of claim 13, further comprising instructions that, when executed by one or more processors, cause the one or more processors to:
    perform at least one wireless connection establishment operation to connect the device and at least the network controller device in the wireless network.

15. The storage device of claim 13, wherein the information identifying the network controller device comprises at least a user-friendly name for the network controller device.

16. The storage device of claim 15, wherein the wireless network is based on the IEEE 802.11 standard.

17. The storage device of claim 16, wherein the probe request response comprises at least a service set identifier and a basic service set identifier for the wireless network.

\* \* \* \* \*